US00RE44931E

(19) United States
(12) Reissued Patent
Anderson

(10) Patent Number: US RE44,931 E
(45) Date of Reissued Patent: Jun. 3, 2014

(54) WATER-BASED DISPERSIONS OF HIGHLY-BRANCHED POLYMERS

(71) Applicant: BASF Corporation, Wyandotte, MI (US)

(72) Inventor: Jeffrey L. Anderson, Eveleth, MN (US)

(73) Assignee: BASF Corporation, Wyandotte, MI (US)

(21) Appl. No.: 13/756,962

(22) Filed: Feb. 1, 2013

Related U.S. Patent Documents

Reissue of:
(64) Patent No.: 7,887,626
Issued: Feb. 15, 2011
Appl. No.: 12/181,462
Filed: Jul. 29, 2008

U.S. Applications:
(60) Provisional application No. 60/952,689, filed on Jul. 30, 2007.

(51) Int. Cl.

| | |
|---|---|
| ***C09D 151/00*** | (2006.01) |
| ***C09D 163/00*** | (2006.01) |
| ***C09D 11/10*** | (2006.01) |
| ***C08L 51/00*** | (2006.01) |
| ***C08L 63/00*** | (2006.01) |

(52) U.S. Cl.
USPC ..... 523/423; 106/31.13; 523/436; 528/297

(58) Field of Classification Search
USPC ..... 106/31.13; 523/402, 423, 436; 525/529, 525/530, 533; 528/111.3, 112, 297
See application file for complete search history.

(56) References Cited

U.S. PATENT DOCUMENTS

| | | | |
|---|---|---|---|
| 4,414,370 | A | 11/1983 | Hamielec et al. |
| 4,529,787 | A | 7/1985 | Schmidt et al. |
| 4,546,160 | A | 10/1985 | Brand et al. |
| 5,756,596 | A | 5/1998 | Pfaendner et al. |
| 5,942,563 | A | 8/1999 | DeGraaf |
| 6,034,157 | A | 3/2000 | Craun et al. |
| 6,194,510 | B1 | 2/2001 | Anderson et al. |
| 6,288,208 | B1 | 9/2001 | Moshinsky |
| 6,541,600 | B1 | 4/2003 | Wang et al. |
| 6,552,144 | B1 | 4/2003 | Campbell et al. |
| 7,034,081 | B2 | 4/2006 | Grun et al. |

FOREIGN PATENT DOCUMENTS

| | | | |
|---|---|---|---|
| EP | 0 684 294 | | 8/1999 |
| GB | 2 151 637 | | 7/1985 |
| GB | 2151637 | A * | 7/1985 |
| JP | 02-000625 | | 1/1990 |
| JP | 06-073335 | | 3/1994 |
| JP | 06-136317 | | 5/1994 |
| JP | 10-290851 | | 11/1998 |
| JP | 2001-247649 | | 9/2001 |
| JP | 2001247649 | A * | 9/2001 |
| KR | 10-2002-0026144 | | 4/2002 |
| KR | 10-2005-0099677 | | 10/2005 |
| WO | WO-2009/018264 | | 2/2009 |

OTHER PUBLICATIONS

Extended Search Report issued in European Patent Application No. 08796777.4 dated Mar. 25, 2011 (3 pages).
International Search Report and Written Opinion issued in International Patent Application No. PCT/US2008/071454 mailed Feb. 17, 2009 (10 pages).
Non-Final Office Action issued in U.S. Appl. No. 12/181,462 dated Jul. 12, 2010 (13 pages).
Notice of Allowance issued in U.S. Appl. No. 12/181,462 dated Oct. 7, 2010 (6 pages).
Office Action received in Japanese Application No. 2010-520126 dated Feb. 7, 2013 (6 pages)—English Translation provided.
Machine translation of JP 2001247649 A, provided by the JPO website (no date).*
International Search Report and Written Opinion for PCT/US2008/071454 dated Feb. 17, 2009.

* cited by examiner

*Primary Examiner* — Michael J Feely
(74) *Attorney, Agent, or Firm* — Foley & Lardner, LLP

(57) ABSTRACT

The present invention provides aqueous dispersions of highly-branched polymers for coating applications and methods for making the polymers. The polymers may have high molecular weights and desirably take the form of microgels. The polymers and dispersions may be formulated with functionalities, viscosities, and solids contents that make them well-suited for use in a variety of coatings including, but not limited to, 2-pack coatings, ultraviolet (UV) curable coatings, inks, and air-dry coatings.

45 Claims, No Drawings

WATER-BASED DISPERSIONS OF HIGHLY-BRANCHED POLYMERS

Matter enclosed in heavy brackets [ ] appears in the original patent but forms no part of this reissue specification; matter printed in italics indicates the additions made by reissue.

CROSS-REFERENCE TO RELATED APPLICATIONS

This U.S. patent application *is a Reissue Application of U.S. Ser. No. 12/181,462, filed Jul. 29, 2008, now U.S. Pat. No. 7,887,626 granted Feb. 15, 2011, and which* claims the benefit of U.S. Provisional patent application 60/952,689, filed Jul. 30, 2007, the entire contents of which are herein incorporated by reference for any and all purposes.

FIELD

The technology generally relates to water-based dispersions of highly-branched, polymers and to methods for making the dispersions.

BACKGROUND

High molecular weight, highly-branched polymers, including microgels, are useful for many coating applications. Such polymers may be made by reacting a acid-functional acrylic resin with a diepoxy compound, as described in U.S. Pat. No. 6,034,157. However, many branched polymers are polymerized and dispersed in organic solvents and, as such, are unsuitable for low volatile organic compound coating applications. In addition, whether water-based or solvent-based, the acid values of these polymers may limit the solids content of coating compositions made therefrom.

SUMMARY

This invention generally relates to a method for forming a highly-branched polymer, the method comprising the steps of: reacting an acid-functional acrylic or styrene-acrylic resin dispersed in water with a polyepoxy-functional resin having at least two epoxy groups to produce a first highly-branched polymer; and subsequently reacting the first highly-branched polymer with a monoepoxy-functional resin or compound to form an aqueous dispersion of a second highly-branched polymer and further functionalized polymer.

Aqueous dispersions of the second highly-branched polymers are well-suited for use in a variety of coating applications, including inks, 2-pack epoxy coatings, ultraviolet (UV) curable coatings and air dry coatings. Aqueous dispersions are also useful as binders for printing inks and overprint varnishes used in graphic arts applications.

DETAILED DESCRIPTION

The present invention provides aqueous dispersions of highly-branched, polymers for coating applications and methods for making the polymers. The polymers may have high molecular weights and desirably take the form of microgels. The polymers and dispersions may be formulated with functionalities, viscosities, and solids contents that make them well-suited for use in a variety of coatings including, but not limited to, 2-pack epoxy coatings, UV or peroxide-curable coatings, and air-dry coatings. The polymers and dispersions are also suited for use as binders in printing inks and overprint varnishes used in graphic arts applications.

One basic method of forming the polymers includes the steps of reacting an acid-functional acrylic resin dispersed in water with a polyepoxy-functional resin having at least two epoxy functional groups to produce a first highly-branched polymer. The aqueous dispersion medium is desirably free of, or substantially free of, organic solvents. The acrylic resin has a relatively high acid value, which makes it possible to achieve a good dispersion for the formation of the first highly-branched polymer. The reaction with the polyepoxy-functional resin increases the branching and molecular weight of the polymer, in some cases resulting in the formation of a microgel. This reaction step sets the viscosity of the polymer and, in the case of microgels, sets the particle size. This first polymer is subsequently reacted with a monoepoxy-functional resin or compound to form an aqueous dispersion of a second highly-branched polymer or microgel. This second reaction further consumes sonic of the acid functionalities on the first polymer, reducing the acid value and making it possible to achieve a higher solids dispersion than would otherwise be possible. Also, the second reaction further functionalizes the polymer. The resulting polymers have good water-resistance and toughness, form films at low VOC content and have high gloss potential.

The term microgel, as used herein, refers to dispersions of polymeric particles which are internally crosslinked without any significant amount of crosslinking in the continuous phase so as to provide dispersions with lower viscosity and higher solids content. These microgels form a continuous network upon film formation.

It is important that the reactions take place in the order described above because if the acid-functional resin is first reacted with the monoepoxy-functional resin or compound, the resulting decrease in acid value and accompanying increase in pH results in a dramatic viscosity increase due to the uncoiling of the polymer. This increase in viscosity may make such dispersions unsuitable for coating applications. In contrast, reacting the acid-functional resin with the polyepoxy-functional resin first, produces a highly-branched polymer that does not uncoil and, therefore, does not produce a substantial viscosity increase upon the subsequent reaction with the monoepoxy-functional resin or compound. This is illustrated in Example 1, below.

The water-dispersible acid-functional acrylic resin used in the present invention is desirably a carboxylic-acid functional resin polymerized from one or more acrylic acid or methacrylic acid monomers and one or more additional ethylenically-unsaturated monomers. These additional monomers may include non-functional acrylates or methacylates, non-functional styrenics, or a combination thereof. Hydroxyl-functional monomers as well as other functional monomers like diacetone acrylamide (DAAM) and acetoacetoxyethyl methacrylate (AAEMA) may also be polymerized into the acrylic resins. The inclusion of hydroxyl functionalities in the acrylic resin is desirable if the polymers are to be used as 2-pack coatings. The DAAM and AAEMA provide dispersions which can be crosslinked under ambient conditions.

The acid-functional acrylic resins typically have relatively low molecular weights, relatively high acid values, and a range of possible hydroxyl values. For example, the acrylic resins may have number average molecular weights ($M_n$) of about 1000 to 10,000, acid values of about 25 to 300, and/or hydroxyl values (i.e., hydroxyl equivalent weights) of about 1 to 250. However, acid-functional acrylic resins having properties outside these ranges may also be employed, provided they are water-dispersible and able to react with epoxy resins to form branched polymers.

The acid-functional resins may be made by known methods. For example, the resins may be emulsion resins formed in the presence of chain transfer agents, or may be made using a continuous, high-temperature polymerization process. Suitable methods for forming acid-functional resins are described in U.S. Pat. Nos. 4,414,370; 4,529,787; 4,546,160; 6,552,144; 6,194,510; and 6,034,157, the entire disclosures of which are incorporated herein by reference.

Examples of hydroxyl-functional acrylic monomers which may be polymerized to provide the acid-functional resins include both acrylates and methacrylates. Examples of these monomers include, but are not limited to, those containing one or more hydroxyl groups such as 2-hydroxyethyl acrylate, 2-hydroxyethyl methacrylate, 2,3-hydroxypropyl acrylate, 2,3-hydroxypropyl methacrylate, 2,4-hydroxybutyl acrylate and 2,4-hydroxybutyl methacrylates, or a mixture of such acrylates or methacrylates.

Examples of non-functional acrylate and methacrylate monomers that may be polymerized to provide the acid-functional resins include, but are not limited to, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. The preferred non-functional acrylate and non-functional methacrylate monomers are butyl acrylate, butyl methacrylate, methyl methacrylate, iso-butyl methacrylate, cyclohexyl acrylate, cyclohexyl methacrylate, isobornyl acrylate, isobornyl methacrylate and combinations thereof. Mixtures of any two or more of the above acrylate and methacrylates monomers may also be used.

The polymeric product of the present invention also may optionally include one or more non-functional styrenic monomers. Styrenic monomers for use in the present invention include, but are not limited to, styrene, α-methylstyrene, p-methylstyrene, t-butylstyrene, o-chlorostyrene, and mixtures of these species. Preferred styrenic monomers for use in the process include styrene and α-methyl-styrene. In the present methods, the polyepoxy-functional resins having two or more epoxy functionalities may be diepoxy resins, or polyepoxy-functional resins. U.S. Pat. No. 6,194,510 describes epoxy-functional condensation polymers that may be employed as the polyepoxy-functional resins of the present invention. The polyepoxy-functional resins may have epoxy values (i.e., epoxy equivalent weights) of about 100 to 1000 (e.g., about 100 to 500 or about 100 to 350) although resins having properties outside these ranges may also be used. In some embodiments, the polyepoxy-functional resins comprise digycidyl ether resins. For example, the polyepoxy-functional resins may comprise cyclohexanedimethanol diglycidyl ether, polypropylene oxide diglycidyl ether or biphenol A diglycidyl ether.

The polyepoxy-functional resins may be reacted with the acid-functional resins using known methods, including those described in U.S. Pat. Nos. 6,194,510 and 6,034,157. These methods typically include the steps of charging an aqueous dispersion of the acid-functional resin into a reaction chamber, adding the polyepoxy-functional resin to the chamber and allowing the reactants to interact at a temperature and for a time sufficient for highly-branched polymers or microgels to form. Such methods are exemplified and described in greater detail in the Examples section below. The mole ratio of the acid-functional resin to the polyepoxy-functional resin in the reaction may vary widely depending on the final desired properties of the polymers.

Naturally, the highly-branched polymer that is the reaction product of the acid-functional resin and the polyepoxy-functional resin will have a higher molecular weight, a lower acid value and a higher hydroxyl value than the acid-functional resin from which it is made. For example, this polymer may have an $M_n$ of about 2200 up to the gel point, and beyond, and an acid value of about 20 to 275. Depending upon whether the acid-functional acrylic resin had hydroxyl functionalities, the resulting highly-branched polymer may have a hydroxyl value of about 10 to 260. However, highly-branched polymer having properties outside these ranges may also be produced.

The monoepoxy-functional resins or compound with which the highly-branched polymers react to form the final product may be mono-functional, wherein the epoxy group is the sole functionality on the resin or compound, or may be multi-functional, wherein the resin or compound includes at least one additional functional group, such as a hydroxyl group. In some embodiments, the monoepoxy-functional resins or compounds may be glycidyl ethers or glycidyl esters. Specific examples of suitable monoepoxy-functional resins or compounds include, but are not limited to, glycidyl methacrylate, glycidyl esters of neodecanoic acid, biphenol A monoglycidyl ether, allyl glycidyl ether and 2-ethylhexyl glycidyl ether. Glycidyl methacrylate is particularly useful in the formation of UV curable coatings. Hydrophobic monoepoxy-functional compounds such as those derived from polyunsaturated alkyl or aralkyl groups are particularly useful for the formation of air dry coatings. The mole ratio of the highly-branched polymer to the monoepoxy-functional resin in the reaction may vary widely depending on the final desired properties of the polymers.

The final, high molecular weight, highly-branched polymers, which typically take the form of microgels, will have higher molecular weights, lower acid values, and higher hydroxyl values than the highly-branched polymers from which they are made. For example, the polymers may have an $M_n$ of about 2500 up to the gel point, and beyond, and an acid value of about 15 to 250, and a hydroxyl value of about 10 to 260. However, final products having properties outside these ranges may also be produced. Aqueous dispersions of the polymer are well-suited for use in a variety of coating applications. Because the polymers are dispersed in water, the viscosity remains low enough that high VOC content is not required. In addition, the lowered acid value of the final product makes it possible to formulate coatings with higher solids contents than could be formulated with comparable polymers made by reacting an acid-functional acrylic resin with an epoxy-functional resin having 2 or more functional groups, but omitting the final reaction with a monoepoxy-functional resin or compound. For example, in some embodiments aqueous dispersions of the high molecular weight, highly-branched polymers having a solids content of at least 35 weight percent (wt. %) may be produced. This includes dispersions having a solids content of at least about 38 wt. % and further includes dispersions having a solids content of at least about 40 wt. %. As such, the microgels of the present invention provide superior low-VOC, high-solids coatings relative to other known microgels.

Abbreviations used herein are:

AA is an abbreviation for acrylic acid;

AAEMA is an abbreviation for acetoacetoxy ethyl methacrylates;

AGE is an abbreviation for allylglycidyl ether;

ARx is an abbreviation for acid-functional resin where x is a sequential number to designate the various acid-functional resins prepared or used;

AV is an abbreviation for acid value;

BA is an abbreviation for butyl acrylate;

BCM is an abbreviation for billion cubic microns per square inch of analox;

blist is an abbreviation for blisters;

brk is an abbreviation for break (slight break through);

CHDMDG is an abbreviation for cyclohexyldimethanol diglycidyl ether;

CTA is an abbreviation for chain transfer agent;

CTER is an abbreviation for a chain transfer emulsion resin;

DAAM is an abbreviation for diacetone acrylamide;

DER is an abbreviation for diepoxy-functional resin;

DN is an abbreviation for degree of neutralization;

DIW is an abbreviation for deionized water;

EHA is an abbreviation for 2-ethylhexyl acrylate;

HBNP is an abbreviation for hyperbranched nanoparticles;

HDI is an abbreviation for 1,6-hexamethylenediisocyanate;

HDPE is an abbreviation for high density polyethylene;

HEMA is an abbreviation for 2-hydroxyethyl methacrylate;

IPDI is an abbreviation for isophorone diisocyanate;

LDPE is an abbreviation for low density polyethylene;

MAA is an abbreviation for methacrylic acid;

MEK is an abbreviation for methylethylketone;

MER is an abbreviation for monoepoxy-functional resin;

MMA is an abbreviation for methylmethacrylate;

$M_n$ refers to number average molecular weight;

NE is an abbreviation for no effect;

OH# is an abbreviation for hydroxyl value;

OPP is an abbreviation for oriented polypropylene;

rng is an abbreviation for ring;

sl is an abbreviation for slight;

sl stn is an abbreviation for slight stain;

STY is an abbreviation for styrene;

$T_g$ is an abbreviation for glass transition temperature;

th is an abbreviation for thru;

UV is an abbreviation for ultraviolet; and

VOC is an abbreviation for volatile organic compound;

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. When "about" is applied to a range, it is to be applied to entire range and not just the first value of the range. For example, a range stating from about X to Y is to be read as from about X to about Y, unless specifically stated otherwise.

The inventions illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally the phrase "consisting essentially of" will be understood to include those elements specifically recited and those additional elements that do not materially affect the basic and novel characteristics of the claimed invention. The phrase "consisting of" excludes any element not specifically specified.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The invention will be further described by reference to the following examples which are presented for the purpose of illustration only and are not intended to limit the scope of the invention. Unless otherwise indicated, all parts are by weight.

EXAMPLES

Example 1

Production of Aqueous Dispersions of Microgels

This example illustrates the importance of reacting the acid-functional resin with a polyepoxy-functional resin prior to the reaction with a monoepoxy-functional compound. In this study, an acid-functional resin, referred to here as "ARx," where x is a sequential number used as a reference for the various acid-functional resins, the formulation of which are shown in Table 1, was reacted with epoxy-functional reactants as follows: (1) AR1 was reacted with a monoepoxy-functional resin of allylglycidal ether (AGE) only; (2) AR1 was reacted with a polyepoxy-functional resin of cyclohexyldimethanol diglycidyl ether (CHDMDG) only; (3) AR1 was reacted first with AGE, followed by reaction of the product with CHDMDG; and (4) AR1 was reacted first with CHDMDA, followed by reaction of the product with AGE.

In addition to the monomeric content of the acid-functional acrylic resin, Table 1 lists its acid value (AV), $M_n$, glass transition temperature ($T_g$), percent $O_2$, and method of production. "SGO" refers to the continuous high-temperature polymerization process described in U.S. Pat. No. 6,552,144 and "emulsion" refers to a chain transferred emulsion process.

TABLE 1

| Resin | MMA | EHA | HEMA | BA | CTA | STY | AA | MAA | AV | $M_n$ | $T_g$ | $O_2$ % | Manufact |
|---|---|---|---|---|---|---|---|---|---|---|---|---|---|
| AR1 | 49 | — | — | 14 | — | 27 | 10 | — | 77 | 5126 | 78 | 23.5 | SGO |
| AR2 | 16 | — | — | 22 | — | 44 | 10 | 8 | 130 | 5025 | 75 | 18 | SGO |
| AR3 | 40 | 18.3 | 5 | — | 1.7 | 25 | — | 10 | 65 | 6000 | 45 | 21.8 | emulsion |

Table 2 shows the ratio of the reactions for each experiment, as well as the molecular weights, acid values (AV), solids content, pH and viscosity of the resulting products. DER is an abbreviation for diepoxy-functional resin, and MER is monoepoxy-functional resin.

TABLE 2

| AR | DER | MER | $M_n$ | $M_w$ | $M_z$ | AV | Wt. % Solids | pH | Viscosity (cP) |
|---|---|---|---|---|---|---|---|---|---|
| AR1 | — | — | 5251 | 16280 | 29070 | 75 | 40 | 7.27 | 618 |
| AR1 | — | AGE | 5410 | 17890 | 34759 | 39 | 39.7 | 7.89 | High |
| AR1 | CHDMDA | — | 6096 | 65673 | 252831 | 62 | 39.93 | 7.45 | 356 |
| AR1 | CHDMDA (second) | AGE (first) | 6125 | 70068 | 292592 | 45 | 39.75 | 7.86 | 18960 |
| AR1 | CHDMDA (first) | AGE (second) | 5613 | 90153 | 385359 | 33 | 40 | 7.96 | 353 |

As shown in Table 2, when the acid-functional resin was first reacted with a monoepoxy-functional resin, the viscosity of the resulting dispersion increased dramatically. In contrast, when the acid-functional resin is first reacted with a polyepoxy-functional resin and then a monoepoxy-functional resin no viscosity increase was observed.

Example 2

Process for the Formation of Microgels

This example illustrates the method of making microgels from various acid-functional resins, polyepoxy-functional resins, and monoepoxy-functional resins. The formulation for each of the acid-functional resins (AR1-AR3) and their acid values, $M_n$, $T_g$, percent $O_2$, and method of production are shown in Table 1, above.

In the first three studies represented here, the highly-branched microgels were made as follows. An aqueous dispersion of the acid-functional resin in deionized water containing a small amount of $NH_4OH$ (28% solution) was charged into a reaction chamber and heated to 85° C. In the case of the fourth study, the resin (AR3), was charged into a reaction chamber and heated to 85° C., followed by the addition of ammonia at 50° C. A diepoxy-functional resin was then added to the chamber and the reaction was allowed to proceed for 60 minutes. The monoepoxy-functional resin was then added to the mixture with a first aliquot of DIW and the reaction was allowed to proceed at 87° C. for 180 minutes. The reaction mixture was then allowed to cool while a second aliquot of DIW was added to the mixture.

The diepoxy-functional resins used in the studies were cyclohexanedimethanol diglycidyl ether (epoxy equivalent weight 160) (ERISYS GE-22 or Heloxy 107), polypropylene oxide diglycidyl ether (epoxy equivalent weight 312) (ERISYS GE-24), and biphenol A diglycidyl ether (epoxy equivalent weight 178) (Epon 825). The monoepoxy-functional resins were glycidyl ester of neodecanoic acid (epoxy equivalent weight 250) (Cardura E or ERISYS GS-110), alkyl C12-C14 glycidyl ethers (epoxy equivalent weight 287) (Heloxy 8) and 2-ethylhexyl ether (epoxy equivalent weight 220) (ERISYS GE-6).

Table 3 shows the amounts of resin, DIW and $NH_4OH$ solution in each the starting acid-functional resin aqueous dispersion for each of the experiments. Table 4 shows the amount of acid-functional resin dispersion (AR), DER, MER and DIW used in the formation of each microgel, as well as the DN, acid value, $T_g$, OH#, wt. % solids content, pH, and viscosity for the microgels and dispersions. The mole ratios for the acid-functional resin/diepoxy-functional resin/monoepoxy-functional resin for each of the four experiments were as follows: (1) 3/2.5/6; (2) 3/2.5/7; (3) 3/2.5/14; and (4) 3/2.5/6.7

TABLE 3

| | (1) | (2) | (3) | (4) |
|---|---|---|---|---|
| AR | 40.6 | 40.6 | 40.4 | — |
| DI Water | 58.2 | 58.2 | 57.8 | — |
| NH4OH (28%) | 1.2 | 1.2 | 1.8 | — |

TABLE 4

| DER | MER | DIW (1) | DPW (2) | DN | AV | $T_g$ (° C.) | | AR | OH# | Wt. & Solids | pH | η (cP) |
|---|---|---|---|---|---|---|---|---|---|---|---|---|
| 3.34 | 3.69 | 5 | 5.35 | 76 | 28 | 37 | (1) | 82.62 | 33 | 39.5 | 7.2 | 218 |
| 1.79 | 3.91 | 5 | 3.52 | 76 | 28 | 52 | (2) | 85.78 | 38 | 38.7 | 7.3 | 135 |
| 1.87 | 6.47 | 5 | 7.5 | 83 | 39 | 41 | (3) | 79.6 | 49 | 39.9 | 8.4 | 33 |
| 1.54 | 3.71 | 5 | 7.52 | 68 | 25 | — | (4) | 81.75 | 51 | 38.7 | 8.1 | 38 |

Example 3

Modification of a Latex to a Hyperbranched Structure

To a 3-neck round bottom flask was charged a latex (Sample 100, 400 g) prepared from 20% styrene, 35% 2-ethylhexyl acrylate, 33.3% butyl methacrylate, 1.67% isooctyl mercaptopropionate, and 10% methacrylic acid. The latex was neutralized using 14% $NH_4OH$ solution (4.34 g). The neutralized latex was then heated to 85° C. and di-epoxide (Heloxy 107, 5.45 g) was added over 30 minutes. After the diepoxide addition the solution was held at 85° C. for 30 minutes, followed by the addition over 30 minutes of monofuncitonal epoxides (Heloxy 8, 11.48 g). The temperature was then raised 87° C. and held for 150 minutes to produce the modified latex. The modified latex (Sample 102) was then cooled and filtered to yield a material having 39.5% solids, a pH of 7.95, and a viscosity of 6 cps as measured at 50 rpm with a #2 spindle.

Example 4

Sample Modification of a Latex to a Hyperbranched Structure

To a 3-neck round bottom flask was charged a latex (Sample 101, 400 g) prepared from 20% styrene, 35% butyl acrylate, 10% methacrylic acid, and 1.93% isooctyl mercaptopropionate. The latex was neutralized using 14% ammonium hydroxide solution (4.39 g). The neutralized latex was then heated to 85° C. and di-epoxide (Erisys GE-24, 5.74 g) was added over 30 minutes. After the di-epoxide addition was completed, the latex was held at 85° C. for 30 minutes, followed by addition over 30 minutes of monofuncitonal epoxide, glycidyl methacrylate (7.57 g). The temperature was then raised 87° C. and held for 150 minutes to produce the modified latex. The modified latex (Sample 103) was then cooled and filtered to yield a material having 39.5% solids, a pH of 7.95, and a viscosity of 6 cps as measured at 50 rpm with a #2 spindle.

Example 5

Inks Prepared with Latexes Having a Hyperbranched Structure

Inks were prepared with each polymer in combination with Flexiverse BFD 1121, a commercially available phthalo blue pigment dispersion from Sun Chemical. The inks were prepared in a 150 mL plastic cup on the Speedmixer. The dispersion was added first to the cup, followed by polymer, and deionized water. The ink was then mixed for 30 seconds at 2400 RPM. The viscosities of four experimental inks prepared by this method were less than 27 seconds, as measured in a Signature Zahn # 2 cup, without any added water.

Each ink was hand-proofed side-by-side versus a standard ink base (Joncryl 2646) using a 360-line handproofer with a cell volume of 2.3 BCM. The inks were proofed on four different plastic substrates: Corona treated HDPE-42 Dyne; Corona treated LDPE-42 Dyne; Acrylic-coated OPP-44 Dyne; and Corona treated modified polylacticacid (Ecoflex)-43 Dyne.

After proofing, the prints were hand dried with a hair dryer for two seconds. After drying, the prints were allowed to sit overnight. Tape adhesion was measured using 3M 610 tape. The color density was also measured and compared to the standard.

TABLE 5

| Formulation | A | B | C | D | E |
|---|---|---|---|---|---|
| Standard | 50.0 | | | | |
| 100 | | 60.0 | | | |
| 101 | | | 60.0 | | |
| 102 | | | | 60.0 | |
| 103 | | | | | 60.0 |
| Flexiverse BFD 1121 | 40.0 | 40.0 | 40.0 | 40.0 | 40.0 |
| DI Water | 10.0 | 0.0 | 0.0 | 0.0 | 0.0 |
| Total | 100.0 | 100.0 | 100.0 | 100.0 | 100.0 |
| Viscosity (seconds, Zahn # 2) | 22.5 | 22.4 | 20.6 | 20.0 | 19.7 |

TABLE 6

| Ink Results Data: | | | | | |
|---|---|---|---|---|---|
| | Standard | Formulation 100 | Formulation 101 | Formulation 102 | Formulation 103 |
| % Adhesion HDPE | 100 | 100 | 100 | 100 | 100 |
| %Adhesion LDPE | 100 | 100 | 100 | 100 | 100 |
| % Adhesion OPP | 95 | 70 | 90 | 75 | 90 |
| % Adhesion Ecoflex | 75 | 60 | 75 | 60 | 75 |
| Transfer Versus Standard on OPP (Difference in Color Density) | Standard | −20.5% | −12.3% | −11.8% | −9.4% |

Example 6

Water-Based 2-Pack Using Hyperbranched Polymers

The HBNP used were made by reacting a low molecular weight acrylic polymer containing both carboxylic acid functionality and hydroxyl functionality with a di-epoxy funstional resin and then a mono-functional epoxy modifier. All reactions were done in water without solvent or additional catalyst. The epoxy functionality reacts with the acid functionality on the acrylic in a facile fashion at 85-90° C. The acrylic polymers in this study were made using a chain transfer emulsion process.

The low molecular weight acrylic polymer used has a $M_n$ of about 6000 and an acid value of 65. This produces an average functionality of about 7 carboxyl groups per molecule. The acrylic polymer is a multi-functional acid that reacts with a di-functional epoxy. As the mole ratio of the acrylic and the epoxy are varied from 3:1 to 1:1, the molecular weight of the condensation polymer increases to and beyond the gel point. The monofunctional epoxy is added to lower the acid value and add hydroxyl functionality. One advantage of the size difference between the acrylic at 6000 $M_n$ and the di-epoxy of 320 $M_n$ is that the molecular weight change can be effected without using a larger amount of the epoxy based on weight percent. Another advantage is that because the reaction is done in the dispersed phase of the colloid particles, viscosity does not increase.

The acrylic polymer is characterized in terms of hydroxyl value, type of soft monomer, and $T_g$. Mole ratio is used to characterize the extent of hyperbrancing. HDI versus IPDI, and mole ratio is used to characterize the water-based isocyanates contribution. Hyperbranched polymers were placed in a jar agitation apparatus and the appropriate isocyanate was added along, with water to make a mixture having a final solids of 40%. Drawdowns on Leneta cards were done, and every hour thereafter, or until gel formed. At 1 hour after preparation an aluminum panel was also prepared for Konig and MEK resistance. The 1 and 3 hour Leneta charts were also tested for chemical resistance. Gloss values were taken on all charts as well.

The CTER used are shown in Table 7. $T_g$ was varied along with hydroxyl value. Calculated $T_g$'s were compared to the measured $T_g$ to show the BA to be the harder monomer and significantly harder than the calculated value.

Each of the acrylic resins was used to make the standard HBNP by reaction with Heloxy 107 (H107) and Heloxy 8 (H8). Heloxy 107 is a diglycidyl ether of cyclohexane dimethanol and the Heloxy 8 is a mono glycidyl ether of a $C_{12}$-$C_{14}$ alcohol. Each of the polymers was made using 3 moles of the CTER and 2.5 moles of the H107 followed by 7 moles of the H8. Two more HBNP polymers were made from Sample 1, only changing the H107 to 2 and 3 moles while adjusting the H8 to 8 and 6 moles to keep the amount of ester the same. All of the data is in Table 8. The hydroxyl content of the final HBNP is the a combination of the hydroxyl content of the CTER and the added hydroxyls of the epoxy ring opening reactions. The epoxy ring opening most likely produces a secondary hydroxyl so it may not be as reactive as the HEMA used in the CTER. Also of interest is the HBNP particle size is not much different from the starting CTER particle size showing the reaction is most likely intra particle.

In the standard test, each of the HBNP was reacted with HW-180 at a 1:1 NCO:OH ratio. The two HBNP with the different mole ratios were also tested at 1.5:1 NCO:OH. The difference in BA:EHA ratio was explored in the reaction of IPDI types by using the Rhodocoat X EZ-D401 water-based isocyanate from Rhodia. Tables 9-11 summarize the results.

Example 7

UV Curable Resins

UV curable Hyperbranched resins were made according to the methods described above. Composition and characteristics of resins used are given in Table 12 and those of HBNPs made from these resins are given in Table 13.

Example 8

Formulation of UV Curable Coatings

UV curable coatings were formulated from UV curable HBNPs given in Table 13. The formula for the coating is given in Table 14. The coatings were prepared by mixing I-III followed by addition of IV. After 5 minutes, V was added, followed by VI, and then mixed for 5 minutes. Ingredients VII, VIII, IX and X were added sequentially. The mixture was stirred for 5 minutes. A coating formulated with HBNP of Example A-1 was cured at 10 meters/min with one 120 w/in lamp. The coating gave a Konig hardness of 94, a gloss of 92 at 60° and a flexibility of 4%.

TABLE 7

| CTER Sample | Composition | Solids | pH | Viscosity | PS N/I | AV | OH# | $T_g$ (Calc) | $T_g$ (Meas) | $M_n$ | $M_w$ |
|---|---|---|---|---|---|---|---|---|---|---|---|
| 1 | 39.2 EHA/24.5 MMA/15 Sty/10 HEMA/10 MAA/1.3 BMPA | 39.8 | 5.8 | 49 | 64/100 | 65 | 43 | 22 | 25 | 6203 | 21117 |
| 2 | 39.2 BA/24.35 MMA/15 Sty/10 HEMA/10 MAA/1.45 BMPA | 40.4 | 6 | 25 | 67/98 | 65 | 43 | 19 | 38 | 6328 | 20664 |
| 3 | 45 EHA/13.76 MMA/15 Sty/15 HEMA/10 MAA/1.24 BMPA | 39.8 | 5.6 | 87 | 58/108 | 65 | 65 | 11 | 11 | 5875 | 21250 |
| 4 | 25 EHA 33.6 MMA 15 Sty 15 HEMA/10 MAA/1.4 BMPA | 40.3 | 5.8 | 21 | 59/135 | 65 | 65 | 44 | 45 | 6036 | 19156 |

TABLE 8

| HBNP Sample | CTER Sample | Moles CTER | wt % CTER | Moles H107 | wt % H107 | Moles H8 | wt % H8 | Solids |
|---|---|---|---|---|---|---|---|---|
| 5 | 1 | 3 | 86.5 | 2.5 | 3.8 | 7 | 9.7 | 38.8 |
| 6 | 2 | 3 | 86.5 | 2.5 | 3.8 | 7 | 9.7 | 39.8 |
| 7 | 1 | 3 | 86 | 2 | 3.1 | 8 | 11 | 39.2 |
| 8 | 1 | 3 | 87 | 3 | 4.6 | 6 | 8.3 | 39.5 |
| 9 | 3 | 3 | 86.5 | 2.5 | 3.8 | 7 | 9.7 | 38.5 |
| 10 | 4 | 3 | 86.5 | 2.5 | 3.8 | 7 | 9.7 | 41.2 |

| HBNP Sample | pH | Viscosity | PS n/I | CTER OH# | Epoxy OH# | HBNP OH# | AV Calc | $T_g$ Calc | $T_g$ meas. |
|---|---|---|---|---|---|---|---|---|---|
| 5 | 7.4 | 181 | 74/100 | 43 | 32 | 70 | 24 | 12 | |
| 6 | 7.5 | 74 | 78/112 | 43 | 32 | 70 | 24 | 9 | |
| 7 | 7.3 | 477 | 76/120 | 43 | 32 | 69 | 24 | 11 | |
| 8 | 7.5 | 416 | 64/129 | 43 | 32 | 70 | 24 | 12 | |
| 9 | 6.9 | 1616 | 86/110 | 65 | 32 | 89 | 24 | 3 | −7 |
| 10 | 7.3 | 291 | 68/140 | 65 | 32 | 89 | 24 | 29 | 26 |

TABLE 9

| CTER Study | | | | | | | | | | |
|---|---|---|---|---|---|---|---|---|---|---|
| Sample | HBNP Sample | $T_g$ | OH No | CTER Sample | $T_g$ | Mole Ratio | Soft Monomer | OH No | Isocyanate used | OH:NCO Mole ratio |
| 11 | 5 | 9 | 70 | 1 | 19 | 3:2.5:7 | EHA | 43 | HW-180 | 1:1 |
| 12 | 6 | 9 | 70 | 2 | 19 | 3:2.5:7 | BA | 43 | HW-180 | 1:1 |
| 13 | 10 | 28 | 89 | 4 | 42 | 3:2.5:7 | EHA | 65 | HW-180 | 1:1 |
| 14 | 9 | 0 | 89 | 3 | 9 | 3:2.5:7 | EHA | 65 | HW-180 | 1:1 |
| 15 | 7 | 9 | 69 | 2 | 19 | 3:2:8 | EHA | 43 | HW-180 | 1:1 |
| 16 | 8 | 10 | 70 | 2 | 19 | 3:3:6 | EHA | 43 | HW-180 | 1:1 |
| Isocyanate type | | | | | | | | | | |
| 17 | 5 | 9 | 70 | 1 | 19 | 3:2.5:7 | EHA | 43 | D-401 | 1:1 |
| 11 | 5 | 9 | 70 | 1 | 19 | 3:2.5:7 | EHA | 43 | HW-180 | 1:1 |
| 18 | 6 | 9 | 70 | 2 | 19 | 3:2.5:7 | BA | 43 | D-401 | 1:1 |
| 12 | 6 | 9 | 70 | 2 | 19 | 3:2.5:7 | BA | 43 | HW-180 | 1:1 |
| Mole Ratio | | | | | | | | | | |
| 15 | 7 | 9 | 69 | 2 | 19 | 3.2:8 | EHA | 43 | HW-180 | 1:1 |
| 19 | 7 | 9 | 69 | 2 | 19 | 3.2:8 | EHA | 43 | HW-180 | 1:1.5 |
| 18 | 8 | 10 | 70 | 2 | 19 | 3:3:6 | EHA | 43 | HW-180 | 1:1 |
| 20 | 8 | 10 | 70 | 2 | 19 | 3:3:6 | EHA | 43 | HW-180 | 1:1.5 |

TABLE 10

| CTER Study | | | | | | | | | | | | |
|---|---|---|---|---|---|---|---|---|---|---|---|---|
| | 2 week | 200 | 10% NaOH | | 100% EtOH | | 70% IPA | | Brake fluid | | Gas | |
| Sample | Konig | MEK | 1 hr | 3 hr | 1 hr | 3 hr | 1 hr | 3 hr | 1 hr | 3 hr | 1 hr | 3 hr |
| 11 | 37 | sl brk th | NE | NE | sl rng | sl rng | | NE | NE | NE | NE | NE |
| 12 | 45 | sl brk th | NE | NE | sl rng | sl rng | sl rng | sl rng | sl stn | sl stn | sl rng | sl rng |
| 13 | 84 | OK | NE | NE | sl rng | sl rng | NE | NE | NE | NE | NE | NE |
| 14 | 33 | OK | NE | NE | NE | NE | NE | NE | NE | NE | NE | NE |
| 15 | 35 | OK | NE | NE | sl rng | sl rng | sl rng | NE | NE | NE | sl rng | sl rng |
| 16 | 43 | 150 | NE | NE | sl rng | sl rng | NE | sl rng | NE | NE | sl rng | sl rng |
| Isocyanate type | | | | | | | | | | | | |
| 17 | 65 | sl brk th | NE | NE | sl rng | sl rng | NE | NE | sl stn | NE | sl rng | sl rng |
| 11 | 37 | sl brk th | NE | NE | sl rng | sl rng | | NE | NE | NE | NE | NE |
| 18 | 71 | sl brk th | NE | NE | sl rng | sl rng | NE | NE | sl stn | sl stn | blist | NE |
| 12 | 45 | sl blk th | NE | NE | sl rng | sl rng | sl rng | sl rng | sl stn | sl stn | sl rng | sl rng |
| Mole Ratio | | | | | | | | | | | | |
| 15 | 35 | OK | NE | NE | sl rng | sl rng | sl rng | NE | NE | NE | sl rng | sl rng |
| 19 | 41 | OK | NE | NE | sl rng | sl rng | sl rng | sl rng | NE | NE | sl rng | sl rng |
| 18 | 43 | 150 | NE | NE | sl rng | sl rng | NE | sl rng | NE | NE | sl rng | sl rng |
| 20 | 48 | OK | NE | NE | sl rng | sl rng | NE | NE | NE | NE | NE | NE |

TABLE 11

| | Gloss | 60/20 | | | | | | |
|---|---|---|---|---|---|---|---|---|
| Sample | In | 1 hr | 2 hr | 3 hr | 4 hr | 5 hr | 6 hr | next day |
| 11 | 87/70 | 87/72 | 87/72 | 87/72 | 87/71 | 87/70 | 87/68 | gel |
| 12 | 88/75 | 88/75 | 88/76 | 88/76 | 88/74 | 88/71 | 88/71 | gel |
| 13 | 89/72 | 86/58 | 89/75 | 88/74 | 88/68 | gel | | |
| 14 | 87/70 | 87/71 | 86/69 | 87/70 | 86/68 | 86/66 | 86/67 | gel |
| 15 | 88/70 | 87/71 | 87/72 | 87/72 | 86/72 | 86/69 | gel | |
| 16 | 88/74 | 88/74 | 88/73 | 87/73 | 87/71 | 87/71 | gel | |
| Isocyanate type | | | | | | | | |
| 17 | 86/68 | 87/71 | 86/67 | 86/67 | 86/68 | 86/68 | 86/66 | gel |
| 11 | 87/70 | 8772 | 87/72 | 87/72 | 87/71 | 87/70 | 87/68 | gel |
| 18 | 86/69 | 86/69 | 86/64 | 83/63 | 81/61 | 60/36 | 55/29 | gel |
| 12 | 88/75 | 88/75 | 88/76 | 88/76 | 88/74 | 88/71 | 88/71 | gel |

TABLE 11-continued

| | Gloss | 60/20 | | | | | | |
|---|---|---|---|---|---|---|---|---|
| Sample | In | 1 hr | 2 hr | 3 hr | 4 hr | 5 hr | 6 hr | next day |
| Mole Ratio | | | | | | | | |
| 15 | 88/70 | 87/71 | 87/72 | 87/72 | 86/72 | 86/69 | gel | |
| 19 | 88/75 | 88/74 | 88/65 | 86/70 | gel | | | |
| 18 | 88/74 | 88/74 | 88/73 | 87/73 | 87/71 | 87/71 | gel | |
| 20 | 89/73 | 88/74 | 88/75 | 88/74 | gel | | | |

TABLE 12

| Resin Example | Composition | AV | Mn | Tg | % O2 | Manufacture |
|---|---|---|---|---|---|---|
| 21 | 49 MMA/27 STY/14 BA/10 AA | 77 | 5126 | 78 | 23.5 | SGO |
| 22 | 44 STY/22 BA/16 MMA/10 AA/8 MAA | 130 | 5025 | 75 | 18 | SGO |
| 23 (also 3) | 45 EHA/13.76 MMA/15 STY/15 HEMA/ 10 MAA/1.24 BMPA | 64 | 5875 | 11 | | Emulsion |

TABLE 13

| Example Number | Resin Used | Moles Resin used | Epoxy used | Moles Epoxy used | Moles GMA | Other Epoxy used | moles used |
|---|---|---|---|---|---|---|---|
| 24 | 21 | 3 | Erisys GE-24 | 2.5 | 9 | none | |
| 25 | 22 | 3 | Epon 825 | 2.5 | 6 | Heloxy 8 | 6 |
| 26 | 21 | 3 | Erisys GE-24 | 2.5 | 8 | Allyl glycidyl ether | 1 |
| 27 | 23 | 3 | Heloxy 107 | 2.5 | 7 | none | |

TABLE 14

UV Formulas

| Reactant ID | Reactant | Amount (wt %) | Feature | Source |
|---|---|---|---|---|
| I | UV Polymer 40% in Water | 87.5 | | |
| II | DIW | 27 | | |
| III | Dynol 604 | 0.4 | Surfactant | Air Products |
| IV | Hexanediol diacrylate | 5 | | |
| V | Tego 805 | 0.5 | Defoamer | Tego Chemie |
| VI | Darocure 1173 | 0.9 | Initiator | Ciba |
| VII | Jonwax 26 | 3.2 | Wax Dispersion | BASF Resins |
| VIII | Tegoglide 440 | 0.2 | Surfactant | Tego Chemie |
| IX | Zonyl FSJ | 0.1 | Surfactant | E I duPont |
| X | DSX 1550 | 0.2 | Rheology Modifier | Cognis |

It is understood that the invention is not confined to the particular formulations and arrangements of parts herein illustrated and described, but embraces all such modified forms thereof as come within the scope of the following claims.

What is claimed is:

1. A method comprising:

reacting an acid-functional acrylic resin or styrene-acrylic resin dispersed in water with a polyepoxy-functional resin having at least two epoxy groups to produce a first highly-branched polymer; and subsequently reacting the first highly-branched polymer with a monoepoxy-functional resin to yeild an aqueous dispersion of a second highly-branched and further functionalized polymer;

wherein:

the [acid-function] *acid-functional* acrylic resin or styrene-acrylic resin has an acid value sufficient to allow for increased branching of the resin.

2. The method of claim 1, wherein the acid-functional acrylic or styrene-acrylic resin is an acid-functional acrylic, methacrylic, styrene-acrylic, or styrene-methacrylic resin.

3. The method of claim 1, wherein the first highly-branched polymer is a microgel.

4. The method of claim 1, wherein the second highly-branched polymer is a microgel.

5. The method of claim 1, wherein the acid-functional acrylic or styrene-acrylic resin further comprises hydroxyl functionalities.

6. The method of claim 5, wherein the acid-functional acrylic or styrene-acrylic resin has a number average molecular weight ($M_n$) of about 1000 to 10,000, an acid value of about 25 to 300, and a hydroxyl value of about 1 to 250.

7. The method of claim 1, wherein the weight percent of the second highly-branched polymer in the aqueous dispersion is at least 40 wt. %.

8. The method of claim 1, wherein acid-functional acrylic or styrene-acrylic resin is an acid-functional acrylic or methacrylic resin prepared from acrylic acid or methacrylic acid and one or more monomers selected from the group consisting of 2-hydroxyethyl acrylate, 2-hydroxyethyl methacrylate, 2,3-hydroxypropyl acrylate, 2,3-hydroxypropyl methacrylate, 2,4-hydroxybutyl acrylate, and 2,4-hydroxybutyl methacrylates.

9. The method of claim 1, wherein the polyepoxy-functional resin having at least two epoxy groups is a diepoxy resin, a polyepoxy-functional resin, or a mixture thereof.

10. The method of claim 9, wherein the polyepoxy-functional resin has an epoxy value of about 100 to 1000.

11. The method of claim 1, wherein the polyepoxy-functional resin having at least two epoxy groups is a diglycidyl ether resin, a cyclohexanedimethanol diglycidyl ether resin, a polypropylene oxide diglycidyl ether resin, or a biphenol A diglycidyl ether resin, or a mixture or blend of any two or more thereof.

12. The method of claim 1, wherein the monoepoxy-functional resin is mono-functional.

13. The method of claim 1, wherein the monoepoxy-functional resin is also hydroxy functional.

14. The method of claim 1, wherein the monoepoxy-functional resin is a glycidyl ether resin, a glycidyl ester resin, or a mixture thereof.

15. The method of claim 1, wherein the monoepoxy-functional resin is a glycidyl methacrylate, a glycidyl ester of neodecanoic acid, a biphenol A monoglycidyl ether, a2-ethylhexyl glycidyl ether, or a mixture of any two or more thereof.

16. The method of claim 1, wherein the acid-functional acrylic or styrene-acrylic resin is an acid-functional acrylic or methacrylic resin prepared from acrylic acid or methacrylic acid and one or more monomers selected from the group consisting of 2-hydroxyethyl acrylate, 2-hydroxyethyl methacrylate, 2, 3-hydroxypropyl acrylate, 2, 3-hydroxypropyl methacrylate, 2,4-hydroxybutyl acrylate, 2, 4-hydroxybutyl methacrylates, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, [2-hydroxyethyl methacrylate,] n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, or isobornyl methacrylates.

17. The method of claim 1, wherein the second highly-branched and further functionalized polymer has a $M_n$ of about 2500 up to the gel point, an acid value of about 15 to 250, and a hydroxyl value of about 10 to 260.

18. The aqueous dispersion of the second highly-branched polymer formed by the method of claim 1.

19. The aqueous dispersion of the second highly branched polymer of claim 18, wherein the second highly branched polymer is a microgel.

20. A printing ink comprising the aqueous dispersion of the second highly-branched polymer formed by the method of claim 1.

21. The printing ink of claim 20, wherein the acid-functional acrylic or styrene-acrylic resin is an acid-functional acrylic, methacrylic, styrene-acrylic. or styrene-methacrylic resin.

22. The printing ink of claim 20, wherein the first highly-branched polymer is a microgel.

23. The printing ink of claim 20, wherein the second highly-branched polymer is a microgel.

24. A UV curable coating comprising the aqueous dispersion of the second highly-branched polymer formed by the method of claim 1.

25. The UV curable coating of claim 24, wherein the acid-functional acrylic or styrene-acrylic resin is an acid-functional acrylic, methacrylic, styrene-acrylic, or styrene-methacrylic resin.

26. The UV curable coating of claim 24, wherein the first highly-branched polymer is a microgel.

27. The UV curable coating of claim 24, wherein the second highly-branched polymer is a microgel.

*28. A 2-pack coating kit comprising:*

*a first pack containing the aqueous dispersion of the second highly-branched polymer formed by the method of claim 1; and*

*a second pack containing an isocyanate.*

*29. A method comprising:*

*reacting an acid-functional acrylic resin or styrene-acrylic resin dispersed in water with a polyepoxy-functional resin to produce a first highly-branched polymer; and*

*reacting the first highly-branched polymer with a monoepoxy-functional resin to yield an aqueous dispersion of a second highly-branched and further functionalized polymer;*

*wherein:*

*the acid-functional acrylic resin or styrene-acrylic resin has an acid value sufficient to allow for increased branching of the resin.*

*30. A coating composition comprising:*

*the aqueous dispersion of the second highly-branched polymer formed by the method of claim 29; and*

*an isocyanate.*

*31. The coating of claim 30, wherein the isocyanate is 1,6-hexamethylenediisocyanate, isophorone diisocyanate.*

*32. The coating of claim 30, wherein the acid-functional acrylic or styrene-acrylic resin is an acid-functional acrylic, methacrylic, styrene-acrylic, or styrene-methacrylic resin.*

*33. The coating of claim 30, wherein the first highly-branched polymer is a microgel.*

*34. The coating of claim 30, wherein the second highly-branched polymer is a microgel.*

*35. The coating of claim 30, wherein the acid-functional acrylic or styrene-acrylic resin further comprises hydroxyl functionalities.*

*36. The coating of claim 30, wherein the weight percent of the second highly-branched polymer in the aqueous dispersion is at least 40 wt. %.*

*37. The coating of claim 30, wherein the acid-functional acrylic or styrene-acrylic resin is an acid-functional acrylic or methacrylic resin prepared from acrylic acid or methacrylic acid and one or more monomers selected from the group consisting of 2-hydroxyethyl acrylate, 2-hydroxyethyl methacrylate, 2,3-hydroxypropyl acrylate, 2,3-hydroxypropyl methacrylate, 2,4-hydroxybutyl acrylate, and 2,4-hydroxybutyl methacrylates.*

*38. The coating of claim 30, wherein the polyepoxy-functional resin is a diepoxy resin, a polyepoxy-functional resin, or a mixture thereof.*

*39. The coating of claim 30, wherein the polyepoxy-functional resin is a diglycidyl ether resin, a cyclohexanedimethanol diglycidyl ether resin polypropylene oxide diglycidyl ether resin, or a biphenol A diglycidyl ether resin, or a mixture or blend of any two or more thereof.*

*40. The coating of claim 30, wherein the monoepoxy-functional resin is mono-functional.*

*41. The coating of claim 30, wherein the monoepoxy-functional resin is also hydroxy functional.*

*42. The coating of claim 30, wherein the monoepoxy-functional resin is a glycidyl ether resin, a glycidyl ester resin, or a mixture thereof.*

*43. The coating of claim 30 wherein the monoepoxy-functional resin is a glycidyl methacrylate, a glycidyl ester of neodecanoic acid, a biphenol A monoglycidyl ether, a 2-ethylhexyl glycidyl ether, or a mixture of any two or more thereof.*

*44. The coating of claim 30, wherein the acid-functional acrylic or styrene-acrylic resin is an acid-functional acrylic or methacrylic resin prepared from acrylic acid or methacrylic acid and one or more monomers selected from the group consisting of 2-hydroxyethyl acrylate, 2-hydroxyethyl methacrylate, 2,3-hydroxypropyl acrylate, 2,3-hydroxypropyl methacrylate, 2,4-hydroxybutyl acrylate, 2,4-hydroxybutyl methacrylates, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylates.*

*45. A 2-pack coating kit comprising:*

*a first pack containing the aqueous dispersion of the second highly-branched polymer formed by the method of claim 29; and*

*a second pack containing an isocyanate.*

* * * * *